(12) United States Patent
Wang et al.

(10) Patent No.: US 12,247,873 B1
(45) Date of Patent: Mar. 11, 2025

(54) LOW POWER SINGLE PHOTON AVALANCHE DIODE PHOTON COUNTER WITH PEAK CURRENT SUPPRESSION TECHNIQUE

(71) Applicant: OMNIVISION TECHNOLOGIES, INC., Santa Clara, CA (US)

(72) Inventors: Rui Wang, San Jose, CA (US); Tiejun Dai, Santa Clara, CA (US); Lindsay Alexander Grant, Campbell, CA (US); Keiji Mabuchi, Cupertino, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/438,791

(22) Filed: Feb. 12, 2024

(51) Int. Cl.
*G01J 1/44* (2006.01)
(52) U.S. Cl.
CPC ......... *G01J 1/44* (2013.01); *G01J 2001/4466* (2013.01)
(58) Field of Classification Search
CPC . G01J 1/44; G01J 2001/4466; G01J 2001/442
See application file for complete search history.

(56) References Cited

U.S. PATENT DOCUMENTS

2020/0045251 A1\* 2/2020 Koizumi ............... H04N 25/79

\* cited by examiner

*Primary Examiner* — Georgia Y Epps
*Assistant Examiner* — Don J Williams
(74) *Attorney, Agent, or Firm* — CHRISTENSEN O'CONNOR JOHNSON KINDNESS PLLC (57) ABSTRACT

A method of counting photons using a plurality of single photon avalanche diodes (SPADs), including initiating a detection phase, enabling each single photon avalanche diode (SPAD) of the plurality of SPADs for a period of time within the detection phase, accumulating a SPAD event from each SPAD of the plurality of SPADs, wherein each SPAD event corresponds to a detection of a single photon, determining a counter code at an end of the detection phase, where the counter code corresponds to accumulated SPAD events, and enabling one or more SPADs of the plurality of SPADs within an exposure phase based on the counter code, where the counter code is greater than an expected number of the SPAD events during the exposure phase, and where the expected number of SPAD events during the exposure phase is based on the counter code that is determined at the end of the detection phase.

20 Claims, 9 Drawing Sheets

LOW POWER SINGLE PHOTON AVALANCHE DIODE PHOTON COUNTER WITH PEAK CURRENT SUPPRESSION TECHNIQUE

BACKGROUND INFORMATION

Field of the Disclosure

This disclosure relates generally to the design of image sensors, and in particular, relates to image sensors having improved peak current suppression.

Background

Image sensors have become ubiquitous. They are widely used in digital still cameras, cellular phones, security cameras, as well as medical, automotive, and other applications. The technology for manufacturing image sensors continues to advance at a great pace. For example, the demands for higher image sensor resolution and lower power consumption motivate further miniaturization and integration of image sensors into digital devices.

Image sensor operates in response to image light coming from an external scene and being incident upon the image sensor. An image sensor includes an array of pixels having photosensitive elements (e.g., photodiodes) that absorb a portion of the incident image light and in response generate corresponding electrical charge. The electrical charge of individual pixels may be measured as an output voltage of each photosensitive element. In general, the output voltage varies as a function of the intensity and duration of the incident light. The output voltage of individual photosensitive elements is used to produce a digital image (i.e., image data) representing an external scene.

In some applications, photodiodes are illuminated by the incoming light through a combination of lens and color filter, thus exposing individual photodiodes to a given color (wavelength) of light, for example, blue, green, or red. Based on the photodiodes being exposed to only a limited wavelength range, the properties of the photodiodes can be optimized, such that, for example, a peak sensitivity of given photodiode is within the target range of light wavelengths. However, the lenses and color filters necessarily attenuate the incoming light, therefore limiting dynamic range of the photodiodes. Therefore, systems and methods are needed for improved illumination and dynamic range of the image sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Image sensors, and in particular, image sensors that include color routers are disclosed. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the terms "about," "approximately," etc., mean+/−5% of the stated value.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, the embodiments of the present technology are directed to image sensors for use under a variety of lighting levels. In some embodiments, the image sensor, via a plurality of single photon avalanche diodes (SPADs) collects a plurality of SPAD events. In some embodiments, the SPAD events are counted, and a counter code is determined. Based on the counter code, one or more SPADs of the plurality of SPADs are enabled. In some embodiments, when light is higher (i.e., the intensity of light is higher), fewer SPADs are needed and therefore enabled, and when light is lower (i.e., the intensity of light is lower), more SPADs are enabled. In this manner, peak current can be reduced or even suppressed.

Figure 1A:
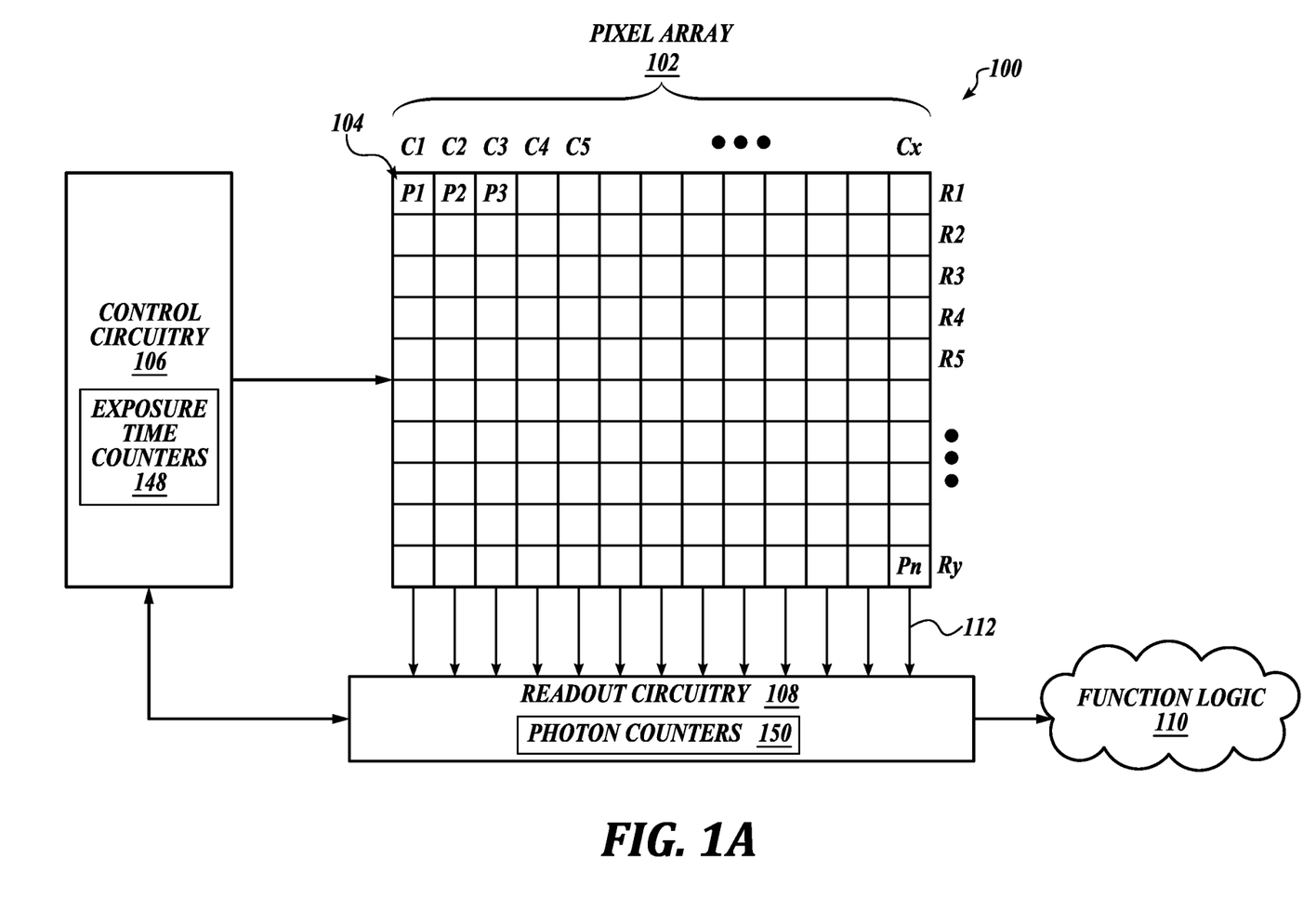
FIG. 1A illustrates an imaging system according to an embodiment of the present disclosure.

FIG. 1A illustrates an example imaging system 100 in accordance with an embodiment of the present disclosure. The imaging system 100 includes a pixel array 102, a control circuitry 106, a readout circuitry 108 (also referred to as a pixel circuitry), one or more photon counters 150 in the readout circuitry 108, and a function logic 110. In one example, the pixel array 102 is a two-dimensional (2D) array of photodiodes or image sensor pixels 104 (e.g., pixels P1, P2 . . . , Pn). As illustrated, the photodiodes are arranged into rows (e.g., rows R1 to Ry) and columns (e.g., column C1 to Cx). In operation, the photodiodes acquire image data of an outside scene, which can then be used to render a 2D image of the person, place, object, etc. However, in other embodiments the photodiodes may be arranged into configurations other than rows and columns.

In an embodiment, after each pixel 104 in the pixel array 102 acquires its image charge, the image data is read out by the readout circuitry 108, and then transferred to the function logic 110. In various embodiments, the readout circuitry 108 may include signal amplifiers, analog-to-digital (ADC) conversion circuitry, one or more photon counters 150, and data transmission circuitry. The function logic 110 may store the image data or even manipulate the image data by applying post image effects (e.g., crop, rotate, remove red eye, adjust brightness, adjust contrast, or otherwise). In some embodiments, the control circuitry 106 and function logic 110 may be combined into a single functional block to control the capture of images by the pixels 104 and the readout of image data from the readout circuitry 108. The function logic 110 may be a digital processor, for example. In one embodiment, the readout circuitry 108 may read one row of image data at a time along readout column lines or may read the image data using a variety of other techniques, such as a serial readout or a full parallel readout of all pixels simultaneously (not illustrated).

In one example, after photon counters 150 have counted photons that have been detected by each pixel cell 104 P1, P2, P3, . . . , Pn, the photon count image data that is read out by readout circuitry 108 through output signals 112 can then be transferred to function logic 110. Function logic 110 may simply store the image data, or even manipulate the image data by applying post image effects (e.g., crop, rotate, remove red eye, adjust brightness, adjust contrast, or otherwise). In one example, control circuitry 106 is coupled to pixel array 102 to control operational characteristics of pixel array 102. In one example, control circuitry 106 is coupled to generate a global shutter signal for controlling photon counting and image acquisition for each pixel cell. In the example, the global shutter signal simultaneously enables all pixels 104 P1, P2, P3, . . . Pn within pixel array 102 to simultaneously enable all of the pixels in pixel array 102 to start counting the number of incident photons detected during a single frame.

In one embodiment, the control circuitry 106 is coupled to the pixel array 102 to control operation of the plurality of photodiodes in the pixel array 102. For example, the control circuitry 106 may generate a shutter signal for controlling image acquisition. In one embodiment, the shutter signal is a global shutter signal for simultaneously enabling all pixels within the pixel array 102 to simultaneously capture their respective image data during a single data acquisition window. In another embodiment, the shutter signal is a rolling shutter signal such that each row, column, or group of pixels is sequentially enabled during consecutive acquisition windows. In another embodiment, image acquisition is synchronized with lighting effects such as a flash.

In one embodiment, readout circuitry 106 includes analog-to-digital converters (ADCs), which convert analog image data received from the pixel array 102 into a digital representation. The digital representation of the image data may be provided to the function logic 110.

As shown in the depicted example, control circuitry 106 also includes exposure time counters 148, which as will be discussed in further detail below, are used to count the exposure times during which the photon counters 150 are enabled to count photons detected in each pixel 104 P1, P2, P3, . . . Pn in pixel array 102 during a frame or sub-frame of pixel array 102 in accordance with the teachings of the present invention. In one example, after the photons have been counted for each pixel 104 P1, P2, P3, . . . Pn of pixel array 102, the respective exposure times and a photon counts for pixels 104 P1, P2, P3, . . . Pn are combined to form a pixel frame value, or in another example a pixel sub-frame value, in accordance with the teachings of the present invention.

In different embodiments, imaging system 100 may be included into a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 1B:
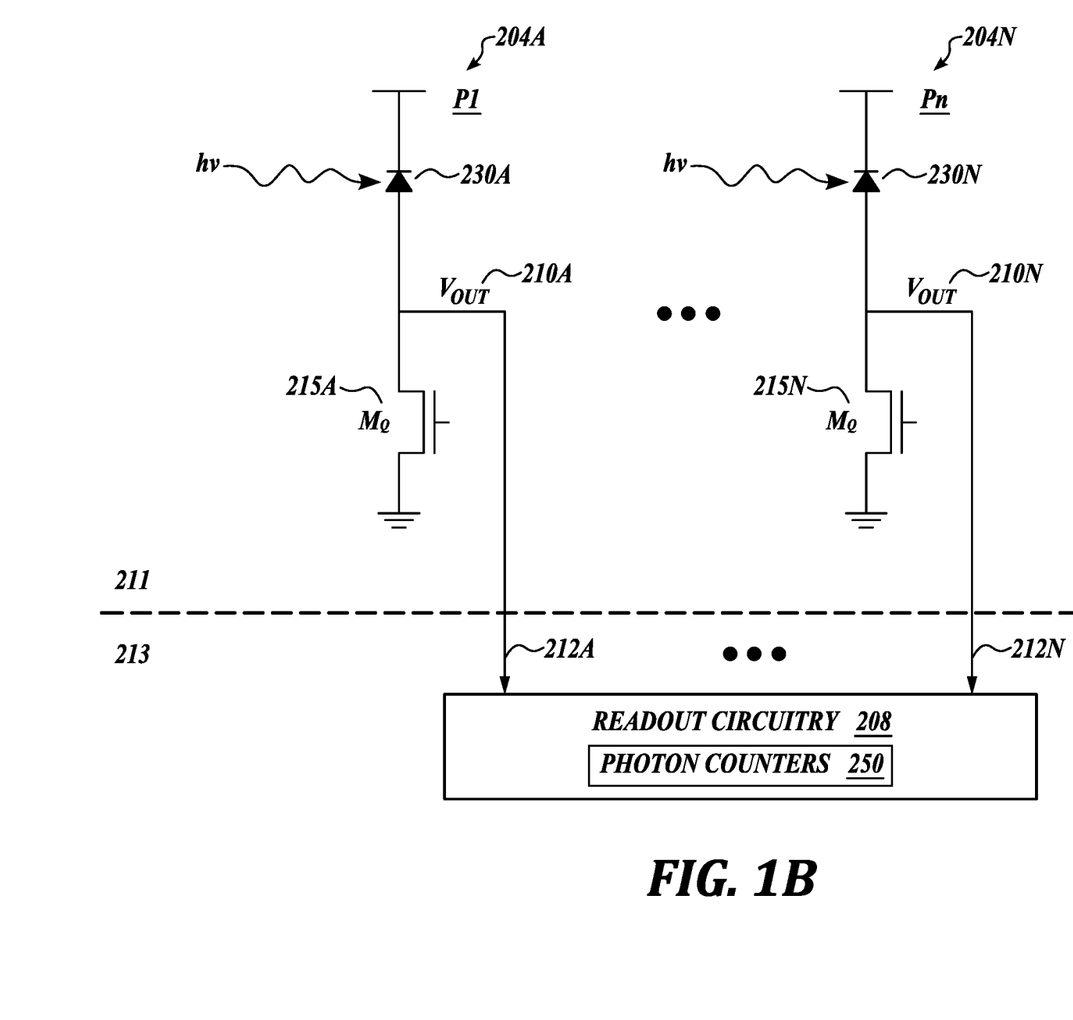
FIG. 1B is a schematic showing example pixels coupled to photon counters, which may be utilized to provide a low power imaging system in accordance with an embodiment of the present disclosure.

FIG. 1B is a schematic showing example pixels coupled to photon counters, which may be utilized to provide a low power imaging system in accordance with an embodiment of the present disclosure. In particular, the example depicted in FIG. 1B shows a plurality of pixels P1 204A to Pn 204N, which are included in a pixel array. In some embodiments, P1 204A and Pn 204N are examples of pixels 104 of the pixel array 102 in FIG. 1A. In one example, the pixels P1 204A to Pn 204N are substantially similar to one another. As shown in the depicted example, pixel P1 204A includes a single photon avalanche diode (SPAD) 230A coupled to a quenching element M Q 215A. In the example, an output signal $V_{OUT}$ 210A indicates when a photon hv from incident light is detected. The output signals $V_{OUT}$ 210A to $V_{OUT}$ 210B are read out with readout circuitry 208 through output signals 212A, 212N. As shown in FIG. 1B, the readout circuitry 208 includes photon counters 150 that can count the number of photons detected by each pixel P1 204A to Pn 204N.

In the example shown in FIG. 1B, it is appreciated that the pixel array including the plurality of pixels P1 204A to Pn 204N are included in a first chip 211, and that the readout circuitry 208 including the photon counters 250 is included in a second chip 213. In the example, the first chip 211 and second chip 213 are stacked together. It is appreciated that by including the plurality of pixels P1 204A to Pn 204N on a separate chip 211 from the readout circuitry 208 in second chip 213, mass production of an imaging system including the plurality of pixels P1 204A to Pn 204N and the photon counters 250 of readout circuitry 208 is more practical in accordance with the teachings of the present invention.

Figure 1C:
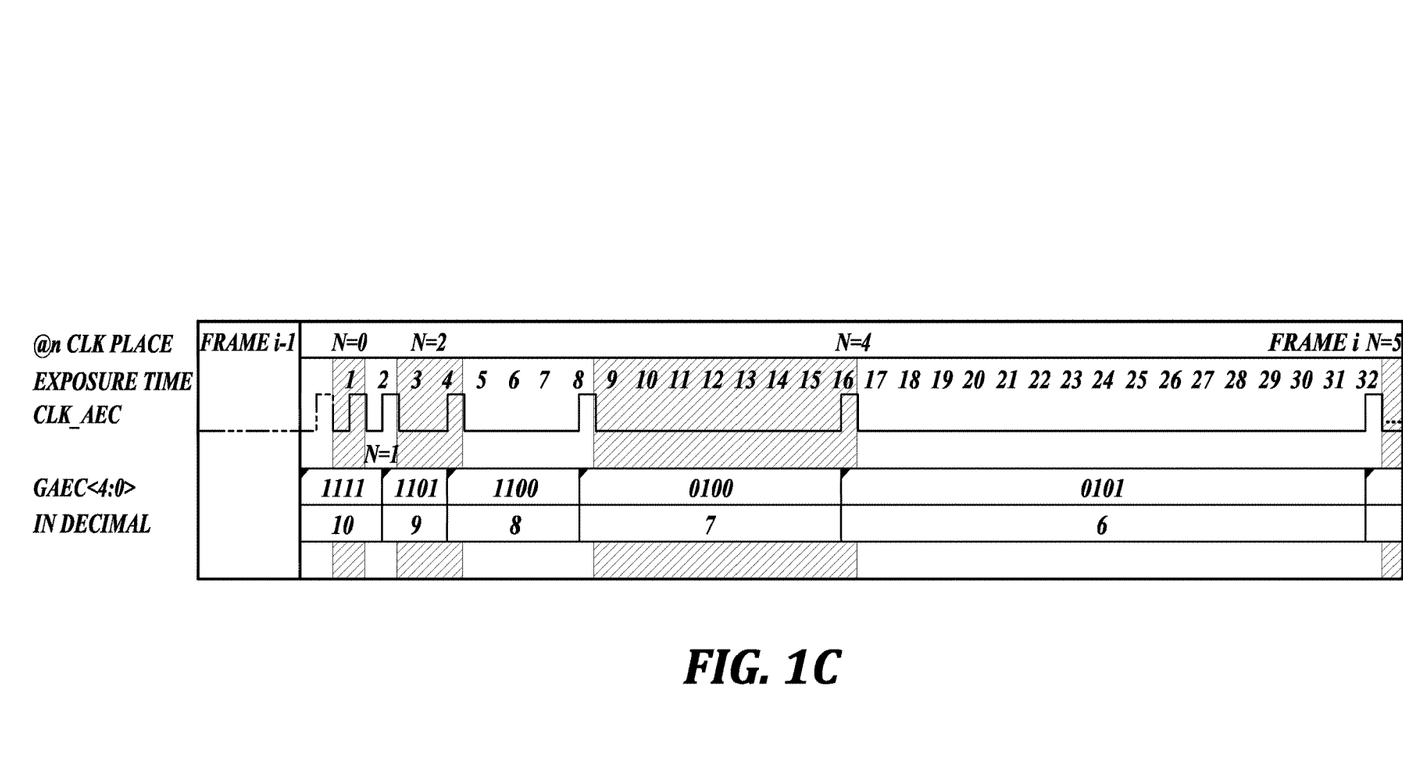
FIG. 1C is a timing diagram showing a lower photon counting working principle, in accordance with the present disclosure.

FIG. 1C is a timing diagram showing a lower photon counting working principle, in accordance with the present disclosure. Illustrated is a process performed by a pixel circuit, such as pixel circuit 100 in FIG. 1A, including a pixel array (such as pixel array 102) having pixels with SPADs coupled to exposure time counters (such as exposure time counters 148) and photon counters (such as photon counters 150, 250) in accordance with the teachings of the present invention.

In some embodiments, the readout circuitry (such as readout circuitry 108, 208) of the pixel circuit (such as pixel circuit 100) includes photon counters (such as photon counters 150, 250). In operation, each photon counter counts a number of photons detected by each pixel in the pixel array. The photon counter is configured to stop counting photons in each pixel when a threshold photon count is reached for each pixel. Control circuitry includes an exposure time counter CLK_AEC configured to count a number of exposure times (exposure units) that elapse before each pixel detects the threshold photon count. Respective exposure time counts, and photon counts are combined for each pixel of the pixel array.

In some embodiments, for each frame FRAME i, there are a total of 1024 exposure units. FIG. 1C shows 32 exposure units of the 1024 exposure units. At the falling edge of each exposure time counter CLK_automatic exposure control (AEC) pulse, the photon counter is checked to determine if the number of photons reaches the photon threshold. In some embodiments, the photon threshold is 63 photons (the least significant bit (LSB) of a ripple counter). In some embodiments, the photon threshold is 512 photons. In some embodiments, gray automatic exposure control (GAEC) code changes at the rising edge of each exposure time counter CLK_AEC pulse. The scale factor for the exposure time in exponents is shown below the GAEC code. The actual time when the exposure time counter CLK_AEC is stopped is expressed as 1/(2^exp) of the full 1024 exposure units, so the latched counter value is scaled up by 2^exp for a linear output, where 'exp' represents an exponent. For example, 2^exp is a number to the second power. The exposure time is shown in FIG. 1C is unit_time×2^N, where N is the first row "@N CLK PLACE". The unit_time is the shaded area under N=0.

In operation, the photon counters are initialized to zero and the exposure time counters are initialized to one. Exposure time counters N are initialized to 0. The pixels are exposed to incident light for duration of time that corresponds to "unit time×2^N". This duration of time is also called an exposure step (N). In one example, the unit time when determining pixel frame values may be 16 μs. It is then determined whether or not any of the respective photon counters for the pixels P1, P2, P3, . . . Pn have reached a threshold photon count.

If the number of photons exceeds the photon threshold, the photon counter is stopped, and the GAEC code is latched. The counting for that pixel is stopped or disabled, and the elapsed exposure time count for that pixel that reached the threshold photon count (e.g., 512 photons) is then saved. In this manner, data may be recovered as expressed in Equation 1 below.

$$LSB<5:0>*2^{exp} \qquad \text{(Equation 1)}$$

where LSB is the least significant bit.

If the number of photons does not exceed the photon threshold, at the next exposure counter CLK_AEC falling edge it is likely that the counter data won't saturate or exceed 255, as at the next exposure counter CLK_AEC edge, the exposure time is double the previous CLK_AEC exposure. The uniform light code will double. If it is less than a second photon threshold, the data latched at the next CLK_AEC edge will still be valid. In some embodiments, the second photon threshold is 127 photons. It is then determined whether the exposure time counter CLK_AEC has reached a threshold exposure time count. In one example, the threshold exposure time count is N=10, T=2^10=1024 for the frame of the pixel array, which in the example corresponds to a total of up to 16.384 ms (i.e., 16 μs×1024) of exposure time. If the exposure time counters CLK_AEC have not reached the threshold exposure time (e.g., N=10), then the exposure time counters are incremented for the pixels that did not reach the threshold photon count (e.g., 512 photons). Once the exposure time counters CLK_AEC are incremented, then the pixels are further exposed to the incident light for additional exposure time. In the illustrated example, each additional exposure increases the total exposure time elapsed for that pixel by a factor of 2.

The counting of photons during each exposure time continues to loop as described above until the exposure time counters have reached the threshold exposure time count (e.g., N=10). Once the threshold exposure time count (e.g., N=10) has been reached, the threshold exposure time count T (e.g., N=10) is saved for each pixel that did not reach the threshold photon count (e.g., 512 photons). The respective exposure time counts T and photon counts are combined for each pixel. Respective exposure time counts N (1 . . . n) are combined with respective photon counts (1 . . . n) to form a pixel frame value (1 . . . n) for each pixel for a frame in accordance with the teachings of the present invention.

In this example, the maximum photon counting event number is less than 256, so the SPAD/counter power consumption is relatively low, especially in comparison with a linear counter which may need to count 2^16 with a 16-bit ripple counter.

For example, for a video graphics array (VGA), the maximum number of SPAD events is 640×480×256. If each SPAD event is represented by the Equation 2 for 120 fps operation, the SPAD power is only 0.849 mW.

$$P = I*V = Q*\frac{V}{t} = Q*V*f = C*V*V*f \quad \text{(Equation 2)}$$

Where Q is the charge stored in coulombs (C), C is the capacitance of a capacitor in farads (f), and V is a voltage across the capacitor in volts (V). In some embodiments, for 120 fps, the SPAD power is 0.849 mW. In such embodiments, the equation is as follows: 10 fF*3V*3V*120*640*480*256=0.849 mW.

Figure 2A:
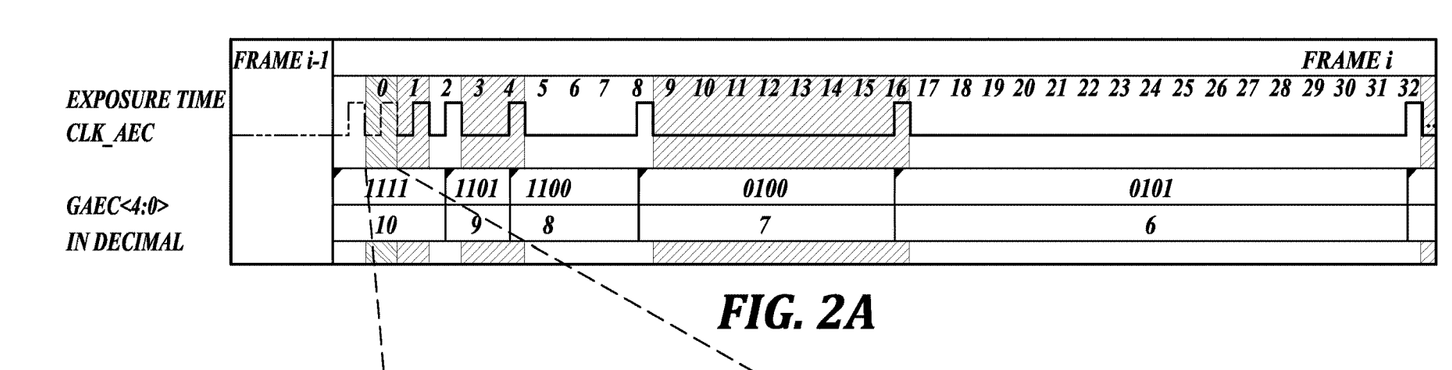
FIG. 2A is a timing diagram showing a dynamic single photon avalanche diode (SPAD) gating technique, in accordance with the present disclosure.

FIG. 2A is a timing diagram showing a dynamic single photon avalanche diode (SPAD) gating technique, in accordance with the present disclosure. In some embodiments, an evaluation phase may be added before exposure phase "1". In such embodiments, the evaluation phase (or detection phase) lasts for one exposure step, where n=0. During this evaluation phase, each SPAD of a plurality of SPADs is enabled to accumulate a SPAD event from each SPAD of the plurality of SPADs for a period of time in the detection phase. It should be understood that as described herein, a SPAD event corresponds to a detection of a single photon. At the end of the detection phase, a counter code is determined. This counter code corresponds to a plurality of SPAD events detected. Based on this counter code, one or more SPADs of the plurality of SPADs are enabled within an exposure phase (exposure phase "1" in FIG. 2A).

Figure 2B:
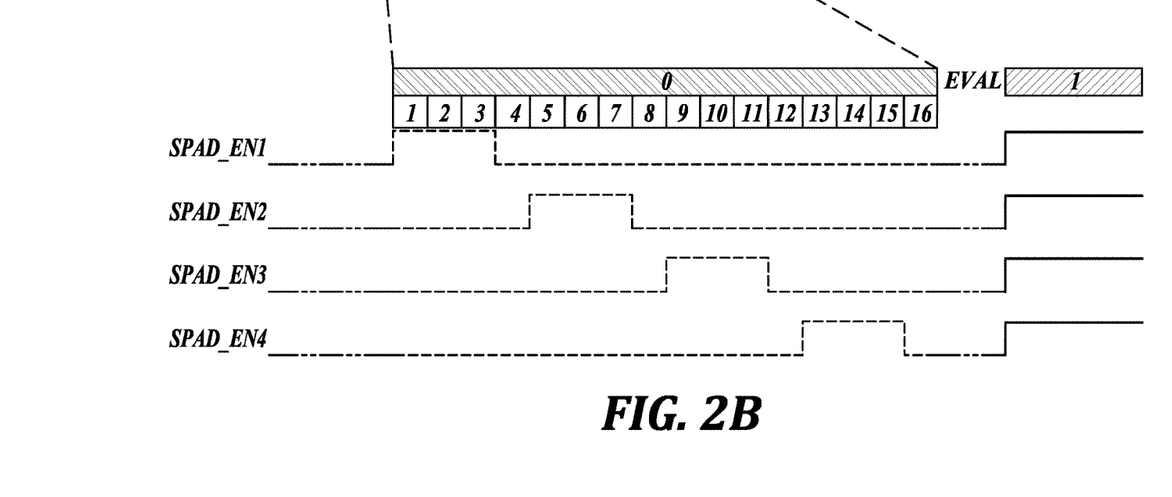
FIG. 2B is an enlarged view of FIG. 2A, in accordance with the present disclosure.

FIG. 2B is an enlarged view of FIG. 2A, in accordance with the present disclosure. The detection phase occurs for a period of time. In some embodiments, the detection phase is the same length as the first evaluation phase 1. In some embodiments, the detection phase is 16 μs. In some embodiments, each SPAD of the plurality of SPADs (illustrated here as four SPADs) is enabled for a period of time during the detection phase.

In some embodiments, each SPAD of the plurality of SPADs is enabled for an equal amount of time. In some embodiments, each SPAD is enabled for a quarter of the detection phase. It should be understood that in a pixel circuit having more than or less than four SPADs, the time could be divided by the number of SPADs in the pixel circuit (such as thirds, fifths, tenths, etc.). In some embodiments, the period of time that each SPAD of the plurality of SPADs is enabled does not overlap with the time that any other SPAD is enabled. For example, as shown in FIG. 2B, each SPAD is enabled for 3 μs of the 16 μs detection phase, with a 1 μs buffer between each. In some embodiments, each SPAD may be enabled directly after the other. In such embodiments, each SPAD would be enabled for 4 μs of the 16 μs detection phase.

In some embodiments, the same ripple counter (exposure time counter CLK_AEC) may accumulate SPAD events for every SPAD in the plurality of SPADs to determine a counter code. If simultaneous SPAD events occur, the peak current will only be ¼. Based on the counter code at the end of the detection phase (0), the SPADs that are enabled can be determined and/or optimized.

For example, if the total count of the counter code is greater than a first threshold, the light is strong. If all four SPADs were enabled at the first exposure step (1), they could saturate. In such a case, SPAD_EN timing may be gated in the next exposure step. In some embodiments, the first threshold is the max event count during the detection phase. In some embodiments, the first threshold is 256 SPAD events (or photons).

Further, in some embodiments, if the total count of the counter code is less than a second threshold, then all four SPADs may be enabled for the first exposure step. In some embodiments, the second threshold is 32 SPAD events (or photons).

Accordingly, under strong lighting conditions, not all SPADs need to be operating, which results in a reduction of peak current. Similarly, in low lighting conditions, all SPADs can be operated, to improve image quality.

Figure 3:
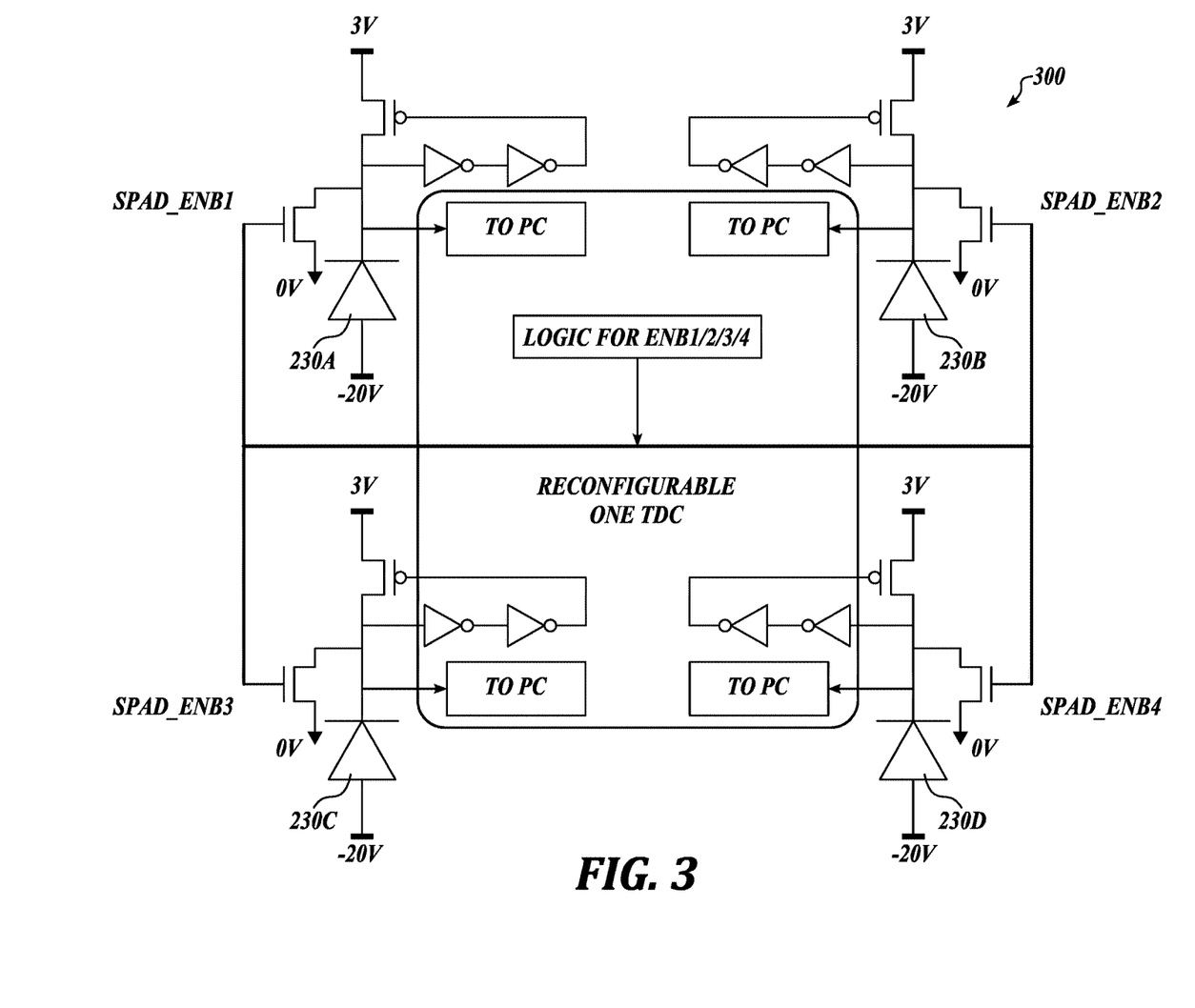
FIG. 3 is an example circuit diagram, in accordance with the present technology.

FIG. 3 is an example circuit diagram, in accordance with the present technology. In some embodiments, each pixel of the pixel circuit is communicatively coupled with an individual SPAD. In some embodiments, the plurality of SPADs may be four SPADs. In some embodiments, the four SPADs are arranged in a 2×2 array, as shown in FIG. 3. In some embodiments, each SPAD of the four SPADs are enabled with a same logic. The four SPADs may be reconfigurable based on a single time to digital convertor (TDC). Each SPAD may be enabled by the same logic. A separate photon counter PC may be used for each SPAD in the pixel circuit. In FIG. 1B, the SPAD is quenched with an N-type metal oxide semiconductor (NMOS) at a diode cathode. In FIG. 3, the SPAD is quenched with a P-type metal oxide semiconductor (PMOS) at a diode anode. These metal oxide semiconductors are merely examples. One skilled in the art should recognize that the pixel circuit may include PMOS quenching, NMOS quenching, or a combination thereof.

When the plurality of SPADs is reconfigurable based on the TDC, there are multiple methods to reduce photon pileup impact which may lead to histogram distortion. In some embodiments, in the detection phase, the first SPAD is enabled and then disabled, the second SPAD is enabled and then disabled, the third SPAD is enabled and then disabled, and finally, the fourth SPAD is enabled and then disabled. It should be understood that each of the four SPADs may be enabled in any order.

In some embodiments, when the counter code meets or exceeds the first threshold, the TDC sequentially enables one SPAD in the plurality of SPADs in the exposure phase. For example, the first time the counter code meets or exceeds the first threshold, the first SPAD is enabled. The second time the counter code meets or exceeds the first threshold, the second SPAD is enabled. In this manner, each SPAD of the plurality of SPADs is enabled every fourth detection phases (or laser (light source) pulse cycles).

In some embodiments, when the counter code meets or exceeds the first threshold, the TDC randomly enables one SPAD in the plurality of SPADs in the exposure phase. In such embodiments, for each detection phase where the counter code meets or exceeds the first threshold, each SPAD in the plurality of SPADs has an equal chance of being enabled.

Figure 4A:
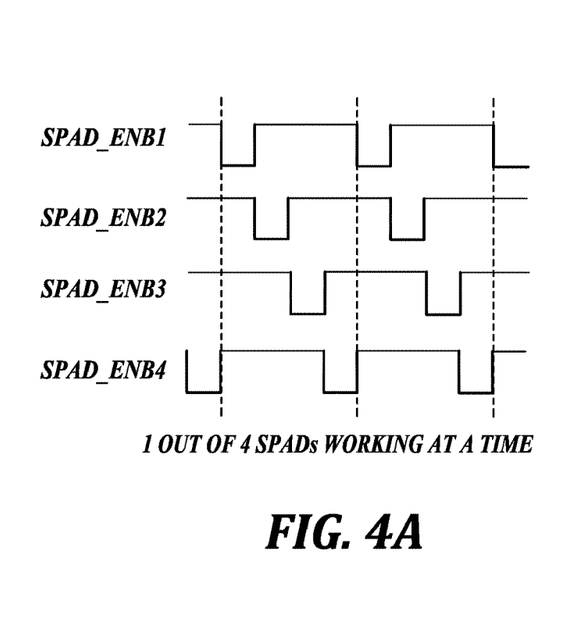
FIGS. 4A-4C are example enablement signals of one or more single photon avalanche photodiodes (SPADs), in accordance with the present technology.
Figure 4B:
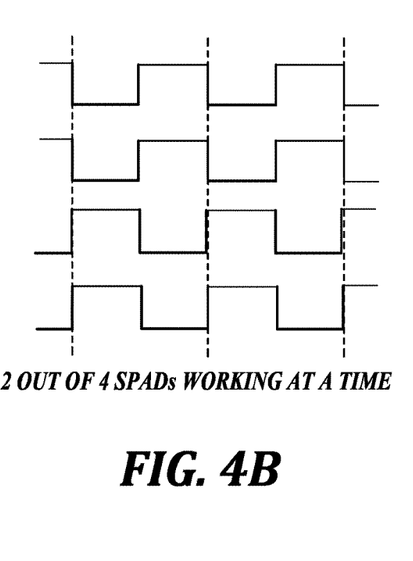
Figure 4C:
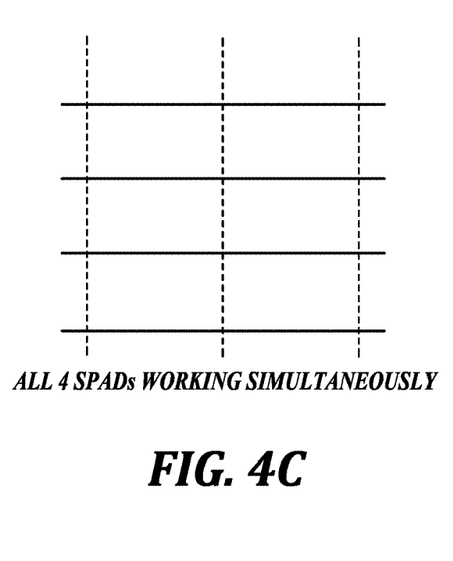

FIGS. 4A-4C are example enablement signals of one or more single photon avalanche photodiodes (SPADs), in accordance with the present technology. On the left side of FIG. 4A, the enablement signal of four SPADs are labeled (SPAD_ENB1, SPAD_ENB2, SPAD_ENB3, SPAD_ENB4). As shown, in some embodiments, during each exposure phase, illustrated as the dashed vertical lines, different SPADs may be enabled based on the counter code.

FIG. 4A shows example enablement signals of four SPADs when one out of four of the SPADs are working at a time. In some embodiments, this occurs when the counter code meets or exceeds the first threshold. In some embodiments, the first threshold is a number of photons that corresponds to high light in an environment. In some embodiments, the second threshold is 256 photons. In some embodiments, the TDC (as shown in FIG. 3) selects one of the SPADs sequentially, each time the counter code meets or exceeds the first threshold. As shown in FIG. 4A, the TDC first enables the first SPAD (SPAD_ENB1), then enables the second SPAD (SPAD_ENB2), then enables the third SPAD (SPAD_ENB3), and then enabled the fourth SPAD (SPAD_ENB4). In this manner, no individual SPAD is used each time the first threshold is met or exceeded, which prolongs the life of the SPAD and prevents over-use of a single SPAD. In some embodiments, the sequence may be different, such as the first SPAD, the third SPAD, the second SPAD, and then the fourth SPAD. In some embodiments, the TDC may select a single SPAD of the plurality of SPADs randomly to avoid the same issue. In such embodiments, each time the counter code meets or exceeds the first threshold, a SPAD of the plurality of SPADs is randomly enabled.

FIG. 4B shows example enablement signals of four SPADs when two of the four SPADs are working at a time. In some embodiments, when the counter code is less than the first threshold, but meets or exceeds a third threshold, as described in FIG. 7, two of the four SPADs are enabled. In some embodiments, as shown in FIG. 4B, when two SPADs are enabled, their enablement may also be sequential. For example, when the counter code exceeds or meets a third threshold, but does not meet or exceed the first threshold, the first SPAD (SPAD_ENB1) and the second SPAD (SPAD_ENB2) are enabled, and when the counter code exceeds or meets the third threshold but does not meet or exceed the first threshold for a second time, the third SPAD (SPAD_ENB3) and the fourth SPAD (SPAD_ENB4) are enabled. In some embodiments, the SPADs are grouped into one or more groups, such as the first SPAD and the second SPAD in a first group, and the third SPAD and the fourth SPAD in a second group. In such embodiments, the TDC may select each group sequentially (such as the first group, and then the second group). As explained above, this may prolong the life of the SPADs and prevent over-use of a single SPAD or group of SPADs. Further, in some embodiments, each SPAD or group of SPADs may be enabled randomly.

FIG. 4C shows example enablement signals of four SPADs when all four SPADs are enabled. In some embodiments, all four SPADs are enabled when the counter code meets or is less than a second threshold. In some embodiments, the second threshold is a number of photons that corresponds with low light. In some embodiments, the second threshold is 32 photons. In some embodiments, when the counter code meets or is lower than the second threshold, all four SPADs are enabled.

Figure 5:
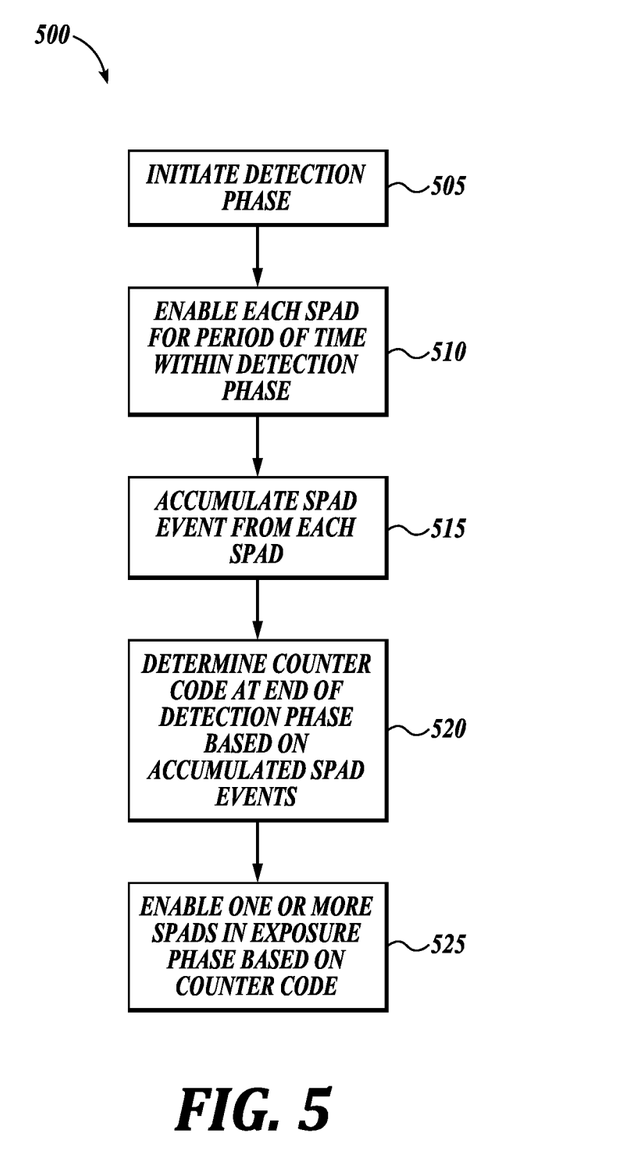
FIG. 5 is an example method of counting photons, in accordance with the present technology.

FIG. 5 is an example method 500 of counting photodiodes, in accordance with the present technology. In some embodiments, the method 500 is carried out with the imaging systems shown and described in FIGS. 1A-4C. In some embodiments, the imaging system (such as imaging systems 100, 200, 300) includes one or more SPADs (such as SPADs 210A-210N), one or more photon counters (such as photon counters 150, 250), and one or more exposure counters (such as exposure counters 148). In different embodiments, the method 500 may be carried with additional steps or without all the illustrated steps.

In block 505, the detection phase (as shown and explained with respect to FIG. 2A-2B) is initiated. In some embodiments, the detection phase is initiated in a first exposure unit (such as "0" in FIGS. 2A-2B).

In block 510, each SPAD in a plurality of SPADs (such as SPADs 210A-210N) is enabled within the detection phase. In some embodiments, the period of time is substantially equal for each SPAD of the plurality of SPADs. In some embodiments, enabling each SPAD of the plurality of SPADs is separated by a delay, so that different SPAD events do not overlap. In some embodiments, such as when the plurality of SPADs is four SPADs, each SPAD is enabled for a quarter, or substantially a quarter of the detection phase.

In block 515, SPAD events are accumulated for each SPAD of the plurality of SPADs. In some embodiments, a single ripple counter is used to accumulate SPAD events for every SPAD in the plurality of SPADs. In some embodiments, each SPAD event corresponds to a detection of a single photon.

In block 520, a counter code is determined at the end of the detection phase based on accumulated SPAD events. In some embodiments, the counter code is compared to one or more thresholds to determine how many SPADs of the plurality of SPADs will be enabled in a later exposure phase, as shown in FIGS. 6-7.

In block 525, one or more SPADs of the plurality of SPADs are enabled in the exposure phase based on the counter code.

Figure 6:
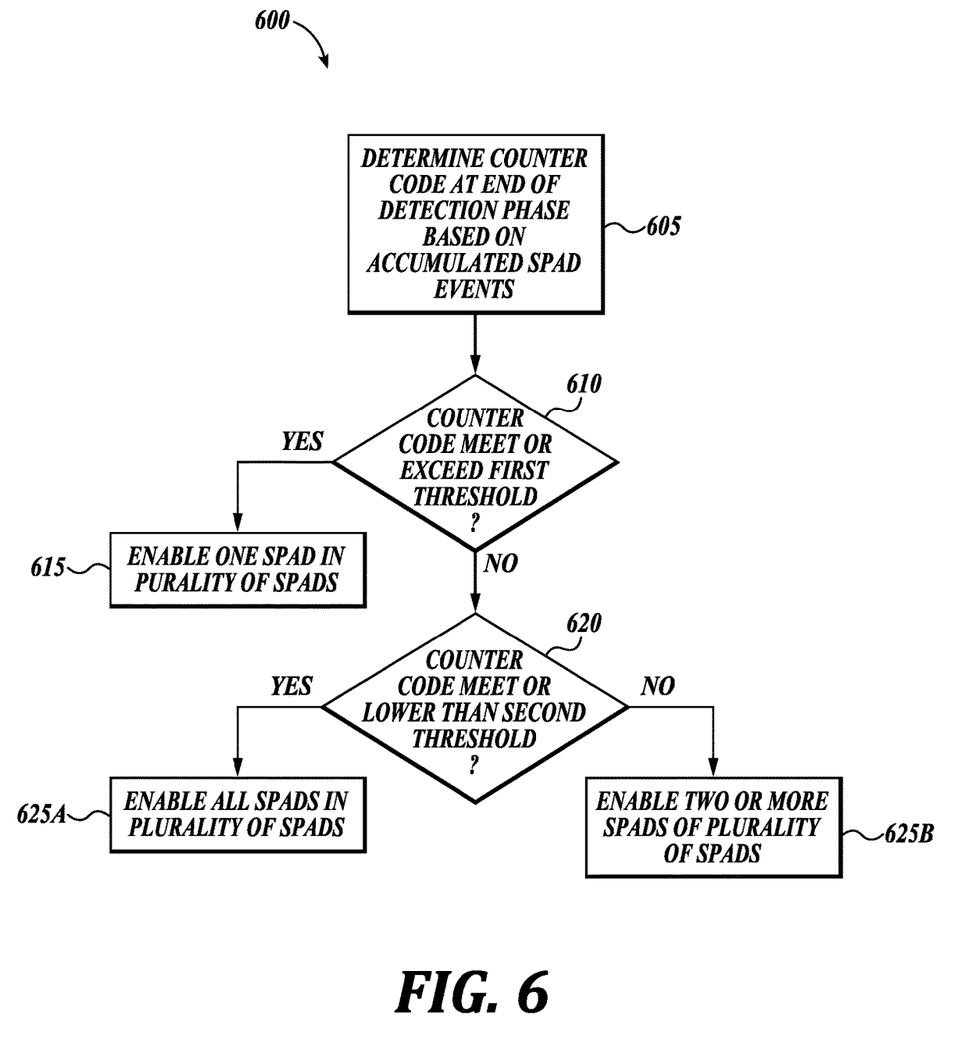
FIG. 6 is another example method of counting photons, in accordance with the present technology.
Figure 7:
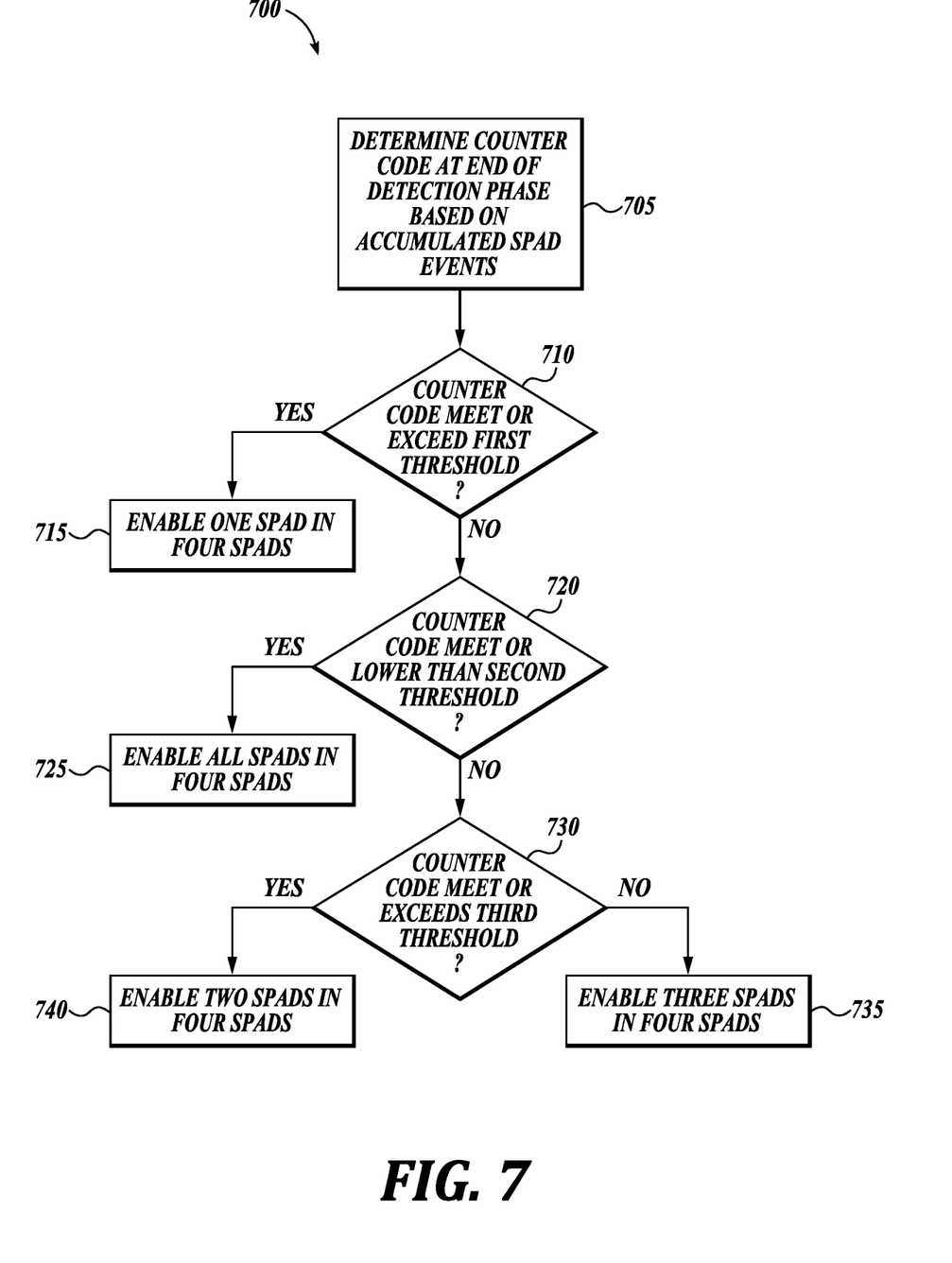
FIG. 7 is yet another example method of counting photons, in accordance with the present technology.

FIG. 6 is another example method of counting photodiodes, in accordance with the present technology. In some embodiments, the method 600 is carried out with the imaging systems shown and described in FIGS. 1A-4C. In some embodiments, the imaging system (such as imaging systems 100, 200, 300) includes one or more SPADs (such as SPADs 210A-210N), one or more photon counters (such as photon counters 150, 250), and one or more exposure counters (such as exposure counters 148).

In block 605, a counter code is determined at the end of the detection phase based on accumulated SPAD events. In some embodiments, the counter code is compared to one or more thresholds to determine how many SPADs of the plurality of SPADs will be enabled in a later exposure phase.

In decision block 610, the counter code is compared to a first threshold. The first threshold may be 256. If the counter code meets or exceeds the first threshold, the method proceeds to block 615.

In block 615, one SPAD of the plurality of SPADs is enabled. In some embodiments, the one or more SPADs are sequentially enabled for each exposure phase, as shown in FIG. 4A. In some embodiments, the one or more SPADs are randomly enabled.

Returning to decision block 610, if the counter code does not meet or exceed the first threshold, the method proceeds to decision block 620.

In decision block 620, it is determined whether the counter code meets or is lower than a second threshold. In some embodiments, the second threshold is 32. In some embodiments, the second threshold corresponds to a low light environment. If the counter code meets or is lower than the second threshold, the method proceeds to block 625A.

In block 625A, all SPADs of the plurality of SPADs are enabled in the exposure phase.

Returning to decision block 620, if the counter code exceeds the second threshold, the method proceeds to block 625B.

In block 625B, two or more SPADs of the plurality of SPADs are enabled in the exposure phase.

FIG. 7 is yet another example method of counting photodiodes, in accordance with the present technology. In some embodiments, the method 700 is carried out with the imaging systems shown and described in FIGS. 1A-4C. In some embodiments, the imaging system (such as imaging systems 100, 200, 300) includes one or more SPADs (such as SPADs 210A-210N), one or more photon counters (such as photon counters 150, 250), and one or more exposure counters (such as exposure counters 148). In some embodiments, the plurality of SPADs is four SPADs, as shown in FIG. 3.

In block 705, a counter code is determined at the end of the detection phase based on accumulated SPAD events. In some embodiments, the counter code is compared to one or more thresholds to determine how many SPADs of the plurality of SPADs will be enabled in a later exposure phase.

In decision block 710, the counter code is compared to a first threshold. The first threshold may be 256. If the counter code meets or exceeds the first threshold, the method proceeds to block 715.

In block 715, one SPAD of the four SPADs is enabled. In some embodiments, the one or more SPADs are sequentially enabled for each exposure phase, as shown in FIG. 4A. In some embodiments, the one or more SPADs are randomly enabled.

Returning to decision block 710, if the counter code does not meet or exceed the first threshold, the method proceeds to decision block 720.

In decision block 720, it is determined whether the counter code meets or is lower than a second threshold. In some embodiments, the second threshold is 32. In some embodiments, the second threshold corresponds to a low light environment. If the counter code meets or is lower than the second threshold, the method proceeds to block 725.

In block 725, all SPADs of the four SPADs are enabled in the exposure phase.

Returning to decision block 720, if the counter code exceeds the second threshold, the method proceeds to decision block 730.

In decision block 730, it is determined whether a counter code meets or exceeds a third threshold. In some embodiments, the first threshold is higher than the second threshold, and wherein the second threshold is lower than the third threshold. If the counter code meets or exceeds the third threshold, the method proceeds to block 740.

In block 740, two of the four SPADs are enabled.

Returning to decision block 735, if the counter coeds does not meet or exceed the third threshold, the method proceeds to block 735.

In block 735, three of the four SPADs are enabled. While FIG. 7 shows a method of counting photons for an imaging system having four SPADs, it should be understood that any number of SPADs may be incorporated into the imaging system. In some embodiments, there may be any number of thresholds to determine how many SPADs of the plurality of SPADs are enabled in the exposure phase.

It should be understood that all methods 500, 600, and 700 should be interpreted as merely representative. In some embodiments, process blocks of all methods 500, 600, and 700 may be performed simultaneously, sequentially, in a different order, or even omitted, without departing from the scope of this disclosure.

What is claimed is:

1. A method of counting photons using a plurality of single photon avalanche diodes (SPADs), the method comprising:
   initiating a detection phase,
   enabling each single photon avalanche diode (SPAD) of the plurality of SPADs for a period of time within the detection phase;
   during the detection phase, accumulating SPAD events from each SPAD of the plurality of SPADs, wherein each SPAD event corresponds to a detection of a single photon;
   determining a counter code at an end of the detection phase, wherein the counter code corresponds to accumulated SPAD events; and
   enabling one or more SPADs of the plurality of SPADs within an exposure phase based on the counter code.

2. The method of claim 1, wherein all SPAD events are accounted for by a single ripple counter.

3. The method of claim 2, wherein each SPAD of the plurality of SPADs is coupled with a photon counter, the method further comprising:
   transmitting each SPAD event from each photon counter to the single ripple counter.

4. The method of claim 1, wherein the period of time is substantially equal for each SPAD of the plurality of SPADs.

5. The method of claim 1, wherein enabling each SPAD of the plurality of SPADs is separated by a delay, so that different SPAD events do not overlap.

6. The method of claim 1, wherein the method further comprises:
   when the counter code meets or exceeds a first threshold, enabling one SPAD of the plurality of SPADs.

7. The method of claim 6, wherein the first threshold is 256.

8. The method of claim 6, wherein the method further comprises:
   when the counter code is less than or equal to a second threshold, enabling all SPADs of the plurality of SPADs.

9. The method of claim 8, wherein the second threshold is 32.

10. The method of claim 8, wherein the method further comprises:
    when the counter code is between the first and second threshold, enabling two or more SPADs of the plurality of SPADs.

11. The method of claim 1, wherein the one or more SPADs are randomly enabled.

12. The method of claim 1, wherein the one or more SPADs are sequentially enabled for each exposure phase.

13. The method of claim 1, wherein the plurality of SPADs is four SPADs.

14. The method of claim 13, wherein the four SPADs are arranged in a two-by-two array.

15. The method of claim 14, wherein the period of time is about one quarter of the detection phase.

16. The method of claim 14, wherein the method further comprises:
    when the counter code meets or exceeds a first threshold, enabling one SPAD of the four SPADs;
    when the counter code meets or is lower than a second threshold, enabling all SPADs of the four SPADs;
    when the counter code meets or exceeds a third threshold, enabling two SPADs of the four SPADs; and
    when the counter code is between the second threshold and the third threshold, enabling three SPADs of the four SPADs, wherein the first threshold is higher than the second threshold, and wherein the second threshold is lower than the third threshold.

17. The method of claim 14, wherein the one or more SPADs of the four SPADs are randomly enabled.

18. The method of claim 14, wherein each SPAD of the four SPADs are sequentially enabled for each exposure phase.

19. The method of claim 1, wherein the plurality of SPADs is incorporated within an image sensor.

20. The method of claim 1, wherein each SPAD of the plurality of SPADs is incorporated within a single pixel of a plurality of pixels of the image sensor.

* * * * *